United States Patent
Boksem

(10) Patent No.: US 10,596,640 B2
(45) Date of Patent: Mar. 24, 2020

(54) DEVICE FOR DRILLING HOLES IN THE AXIAL AND RADIAL DIRECTION OF A BLADE ROOT OF A WIND TURBINE

(71) Applicant: Kooyen Holding B.V., Den Ham (NL)

(72) Inventor: Cornelis Boksem, Den Ham (NL)

(73) Assignee: Kooyen Holding B.V., Den Ham (NL)

( * ) Notice: Subject to any disclaimer, the term of this patent is extended or adjusted under 35 U.S.C. 154(b) by 0 days.

(21) Appl. No.: 15/733,010

(22) PCT Filed: Dec. 19, 2017

(86) PCT No.: PCT/NL2017/050852
§ 371 (c)(1),
(2) Date: Jun. 12, 2019

(87) PCT Pub. No.: WO2018/117826
PCT Pub. Date: Jun. 28, 2018

(65) Prior Publication Data
US 2019/0375027 A1    Dec. 12, 2019

(30) Foreign Application Priority Data
Dec. 23, 2016   (EP) ..................................... 16206806

(51) Int. Cl.
*B23B 39/18*    (2006.01)
*B23B 41/00*    (2006.01)
(Continued)

(52) U.S. Cl.
CPC .............. *B23B 39/18* (2013.01); *B23B 39/16* (2013.01); *B23B 41/00* (2013.01); *B23Q 1/48* (2013.01);
(Continued)

(58) Field of Classification Search
CPC ......... B23B 39/16; B23B 39/18; B23B 41/00; B23Q 1/48; B23Q 39/02; Y10T 408/38
See application file for complete search history.

(56) References Cited

U.S. PATENT DOCUMENTS 3,797,363 A * 3/1974 Nohejl ................... B23Q 3/157
                                                          29/26 R
4,593,731 A * 6/1986 Tanaka ..................... B23Q 5/04
                                                         144/145.2
(Continued)

FOREIGN PATENT DOCUMENTS

CN    203044956 U    7/2013
CN    203044957 U    7/2013
(Continued)

OTHER PUBLICATIONS

Decision to grant a patent in application EP16206806.8 dated Apr. 4, 2019.
(Continued)

*Primary Examiner* — Eric A. Gates
(74) *Attorney, Agent, or Firm* — Oppedahl Patent Law Firm LLC

(57) ABSTRACT

The invention relates to a device (1) for drilling holes in the axial and radial direction of a blade root of a wind turbine, wherein the device comprises: —a first base (2), which is to be stationary positioned on the ground; —a second base (3), which is moveably mounted to the first base (2) and movable along a first direction; —first drive means for positioning the second base (3) along the first direction; —a rotary arm (4), which is pivotally mounted to the second base (3) around a main axis (5); —second drive means for rotating the rotary arm (4) around the main axis (5); —wherein the rotary arm (4) comprises a guide track (7) which extends from a first outer end to a second outer end of the rotary arm (4) thereby passing the main axis (5); —first drilling means (8) moveably arranged on the guide track (7), comprising a first drilling tool (8-1) for drilling holes in a second direction (8-2), which second direction (8-2) is perpendicular to the main axis (5) and—third drive means for positioning the first drilling means (8) along the guide track (7); —second
(Continued)

drilling means (9) mounted on the rotary arm (4), comprising a second drilling tool for drilling holes in a third direction (9-2), which third direction (9-2) is parallel to the main axis (5).

8 Claims, 3 Drawing Sheets

(51) Int. Cl.
  *B23Q 39/02* (2006.01)
  *B23Q 1/48* (2006.01)
  *B23B 39/16* (2006.01)

(52) U.S. Cl.
  CPC ............ *B23Q 39/02* (2013.01); *B23B 39/168* (2013.01); *B23B 2215/81* (2013.01); *Y10T 408/38* (2015.01)

(56) References Cited

U.S. PATENT DOCUMENTS

| | | | |
|---|---|---|---|
| 4,696,197 A | 9/1987 | Hannel | |
| 6,257,109 B1 * | 7/2001 | Shinohara | B23B 3/162 82/1.11 |
| 6,387,025 B1 * | 5/2002 | Watanabe | B23Q 3/15713 29/40 |
| 6,842,954 B2 * | 1/2005 | Ronneberger | B23F 5/02 29/50 |
| 2014/0223711 A1 * | 8/2014 | Feichtl | B23Q 39/02 29/56.5 |

FOREIGN PATENT DOCUMENTS

| | | | |
|---|---|---|---|
| DE | 1402174 A1 | 7/1969 | |
| DE | 2602840 A1 * | 7/1977 | ............. B23B 39/16 |
| DE | 3146429 A1 * | 6/1983 | ........... B23B 39/161 |
| DE | 9211359 U1 * | 11/1992 | ............. B23B 39/18 |
| DE | 102017121370 A1 * | 3/2019 | ............. B23Q 5/043 |
| EP | 1099522 A2 | 5/2001 | |

OTHER PUBLICATIONS

International Search Report in application PCT/NL2017/050852, dated Apr. 24, 2018.
Written opinion of the International Searching Authority in application PCT/NL2017/050852, dated Apr. 24, 2018.

* cited by examiner

DEVICE FOR DRILLING HOLES IN THE AXIAL AND RADIAL DIRECTION OF A BLADE ROOT OF A WIND TURBINE

The invention relates to a device for drilling holes in the axial and radial direction of a blade root of a wind turbine, wherein the device comprises:
- a first base, which is to be stationary positioned on the ground;
- a second base, which is moveably mounted to the first base and movable along a first direction;
- first drive means for positioning the second base along the first direction;
- a rotary arm, which is pivotally mounted to the second base around a main axis
- second drive means for rotating the rotary arm around the main axis;
- wherein the rotary arm comprises a guide track which extends from a first outer end to a second outer end of the rotary arm thereby passing the main axis;
- first drilling means moveably arranged on the guide track, comprising a first drilling tool for drilling holes in a second direction, which second direction is perpendicular to the main axis and
- third drive means for positioning the first drilling means along the guide track;
- second drilling means mounted on the rotary arm, comprising a second drilling tool for drilling holes in a third direction, which third direction is parallel to the main axis.

The device according to the preamble is known in the state of the art. The device is described in the Chinese patent application CN203044956U. The device is used for drilling holes in axial and radial direction of the blade root for accommodation of T-bolts. The T-bolts are used for connecting the (rotor) blade to a hub of the wind turbine. The device is also used for face milling the blade root. Therefore the device also includes face milling means arranged on the rotary arm.

The known device is placed in the lengthwise direction of a blade of a wind turbine, near the blade root. The blade root parameters are entered into or measured by the device to determine the position of the axial and radial holes around the rim of the blade root.

The invention has for its purpose to improve the device according to the preamble.

The device according to the invention therefore has the characterizing features that the rotary arm comprises a recess, wherein the second drilling means are accommodated in the recess and at least partially moveably arranged on the guide track and which device comprises fourth driving means for positioning the second drilling means along the guide track, wherein an imaginary plane defined by the second and third direction includes the main axis.

The device according to the invention has the advantage that the angular positioning of the rotary arm for drilling radial and axial holes is done simultaneously. After angular positioning of the rotary arm for drilling an axial hole, the rotary arm is automatically positioned for drilling a radial hole and vice versa. Once the rotary arm is positioned to drill each radial hole, at each radial hole the opposite axial hole can be drilled simultaneously. Vice versa once the rotary arm is positioned to drill each axial hole, at each axial hole the opposite radial hole can be drilled simultaneously. Advantageously these technical features ensure that axial and radial holes around the circumference of the blade root are always drilled correctly and can be drilled simultaneously.

Furthermore the fourth driving means allow for positioning of the second drilling means at a circle defined by the Bolt Circle Diameter or BCD, which is the diameter of the circle that goes through the center of all of the bolts (and radial holes).

In a preferred embodiment of the device according to the invention, the device comprises a plate which is moveably arranged on the guide track, wherein the second drilling means are arranged on a first side of the plate, the plate comprises a passage for passing of the second drilling tool from the first side to a second, opposite, side of the plate. This allows for more precise positioning of the second drilling means using the same guide track as the first drilling means.

For a perfect balance the recess is preferably symmetrical in lengthwise direction of the rotary arm.

The guide track preferably comprises two parallel rails, which rails are arranged in a plane centered and perpendicular with respect to the main axis.

The invention will now be described in more detail by the following figures, wherein.

The same components are designated in the different figures with the same reference numerals.

Figure 1:
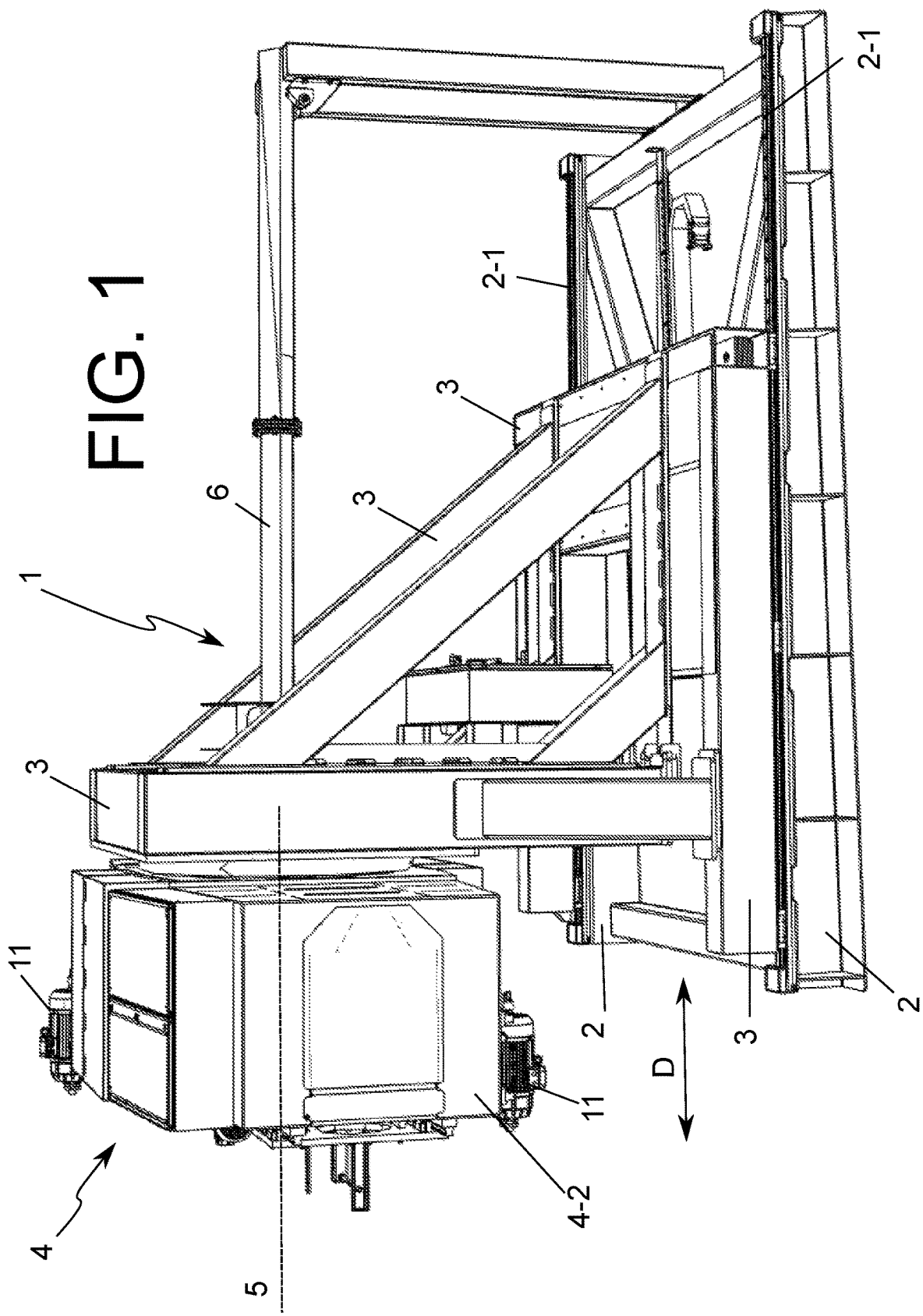
FIG. 1 shows a side view of the preferred embodiment of a device according to the invention.

FIG. 1 shows a side view of the preferred embodiment of a device 1 according to the invention. The device 1 is used for drilling holes in the axial and radial direction of a blade root of a wind turbine. The blade nor the blade root is not shown in this figure. The device 1 is fixed on the ground through a first base 2. First base 2 is attached to the (concrete) ground with known fixing means, like a bolt-nut connection. On first base 3, a second base 3, is moveably mounted to the first base 2 and movable along a longitudinal first direction D. To keep base 3 on the first direction D, tracks 2-1 are installed on first base 3. The device 1 comprises first drive means (not shown) for positioning second base 3 along the first direction D. The first drive means preferably comprises an electric motor. A rotary arm 4 is pivotally mounted to the second base 3 around a main axis 5. The main axis 5 is substantially parallel to the first direction D. The rotary arm 4 is rotatable in a plane perpendicular to the first direction D. It is apparent that the device 1 comprises second drive means for rotating the rotary arm 4 around the main axis 5. The second drive means are located on the second base 3 near the rotary arm 4 around main axis 5 and are not visible in this figure. The device 1 further comprises a suction pipe 6, which is located in the extension of axis 5. The suction pipe 6 is used for discharging of waste material during the drilling of the holes. Preferable suction pipe 6 comprises telescopic pipe sections.

Figure 2:
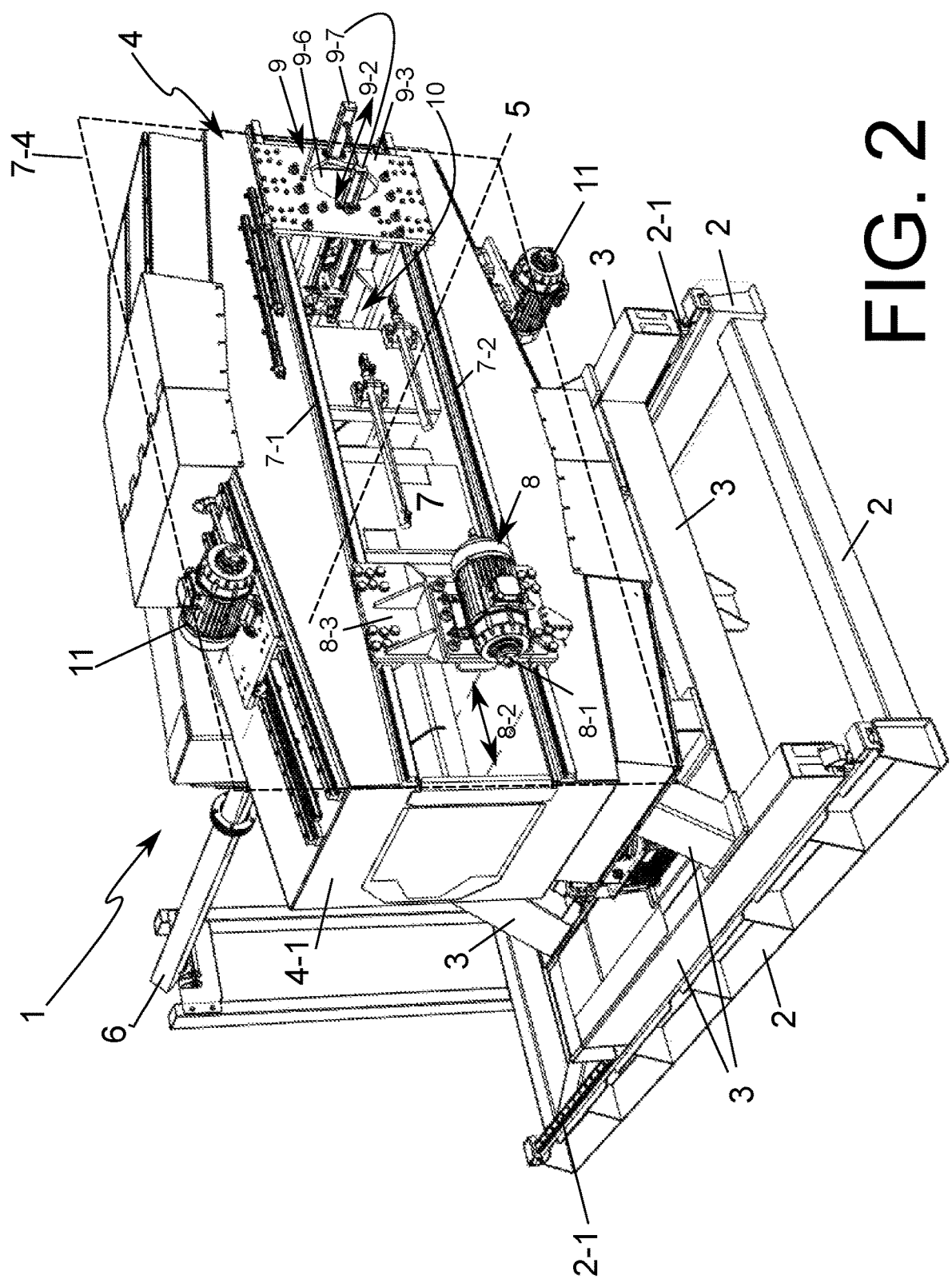
FIG. 2 shows a front view of the preferred embodiment of a device according to the invention.

FIG. 2 shows a front view of the preferred embodiment of a device 1 according to the invention. The rotary arm 4 comprises a guide track 7 which extends from a first outer end 4-1 to a second outer end 4-2 of the rotary arm 4 thereby passing the main axis 5. The guide track 7 comprises two parallel rails 7-1;7-2. These rails 7-1;7-2 are arranged in a plane 7-4 centered and perpendicular with respect to the main axis 5. The device 1 further comprises first drilling means 8, which are arranged on a first plate 8-3 and which first plate 8-3 is moveably arranged on the guide track 7. The first drilling means 8 comprising a first drilling tool 8-1 for drilling holes in a second direction 8-2. Second direction 8-2 is perpendicular to the main axis 5 and is parallel to the plane 7-4. It is apparent that the device 1 comprises third drive means for positioning the first drilling means 8 along the guide track 7. These third drive means are not shown in this figure, but are preferably located behind plate 7-4.

The device 1 further comprises second drilling means 9 mounted on the rotary arm 4. The second drilling means 9 are intended for drilling holes in a third direction 9-2, which third direction 9-2 is parallel to the main axis 5 and perpendicular to plane 7-4. The second drilling means 9 are accommodated in a recess 10 and are at least partially moveably arranged over the guide track 7 for positioning the second drilling means 9 at a circle defined by the BCD. The second drilling means 9 are therefore arranged on a second plate 9-3, which is connected to each of the rails 7-1;7-2 of the guide track 7. The device 1 further comprises fourth driving means for positioning the second drilling means 9 along the guide track 7, which are not shown in this figure.

An imaginary plane defined by the second and third direction 8-2;9-2 includes the main axis 5. This feature allows for a single positioning of the rotary arm 4 for drilling an axial and a radial hole in the blade root.

The device 1 can also be used for face milling the blade root or sawing the blade root. Therefore the device 1 can be fitted with face milling means or sawing means 11, which can be arranged on multiple sides of the rotary arm 4. The face milling means 11 are also mounted on guide track in order to move along the side of the rotary arm 4 for face milling the entire face of the blade root.

In the known device of the state of the art the second drilling means are arranged at a similar position as the face milling means 11 of the device 1. The positioning of the second drilling means in the known device is more difficult since the second drilling means are fitted on a separate guide track on the side of the rotary arm.

Figure 3:
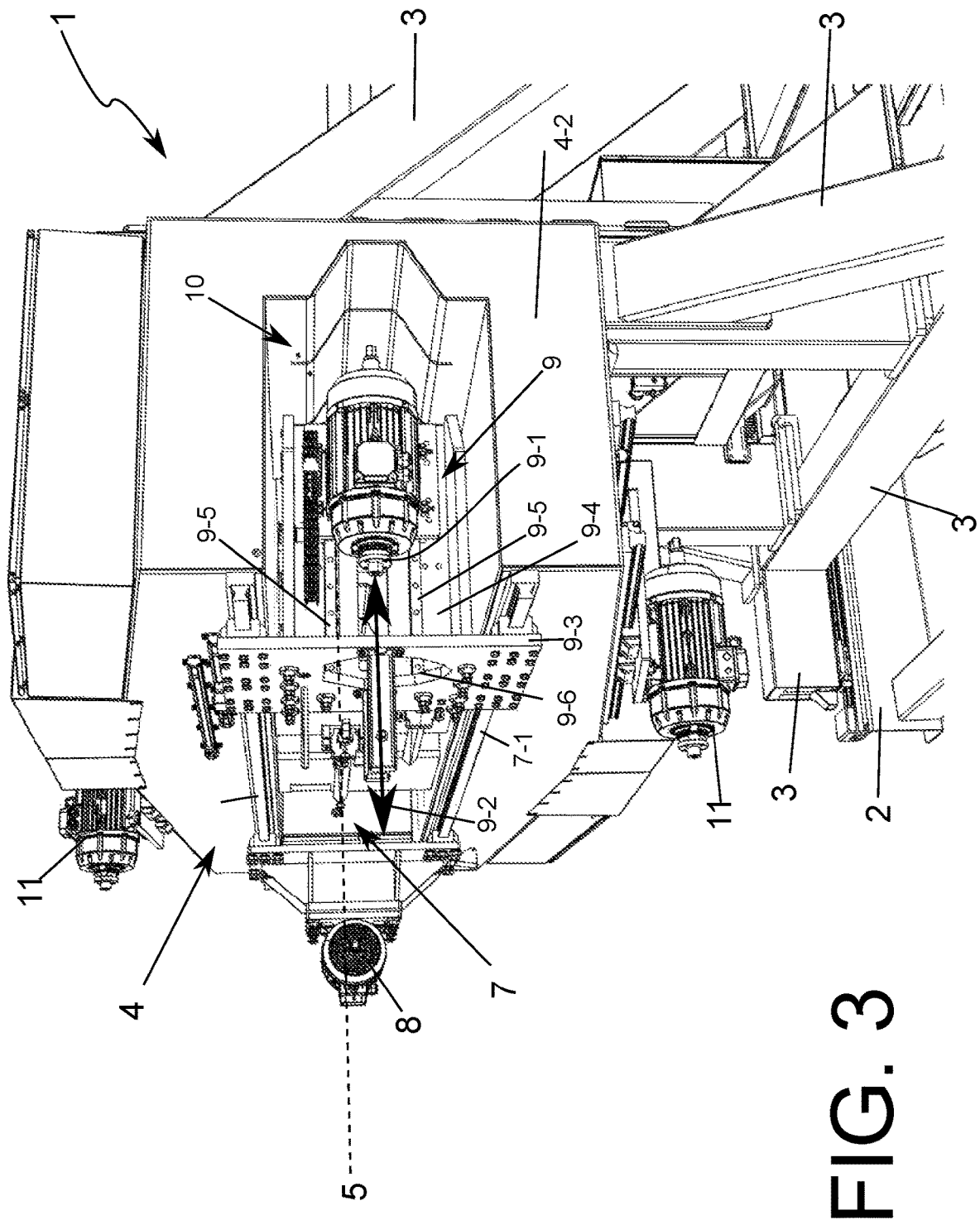
FIG. 3 shows a second side view from an outer end of the rotary arm of the preferred embodiment of a device according to the invention.

FIG. 3 shows a second side view from the second outer end of the rotary arm 4 of the preferred embodiment of a device 1 according to the invention, which figure will be used to further describe the second drilling means 9. For this reason, an end cap has been removed in order to show the recess 10. The second drilling means 9 comprises a second drilling tool 9-1 for drilling holes in the third direction 9-2. The second drilling means 9 further comprises a third plate 9-4, which third plate 9-4 is arranged substantially traverse on second plate 9-3. The second drilling tool 9-1 is mounted on the third plate 9-4 through a second guide track 9-5 in order to displace the second drilling tool 9-1 in the third direction 9-2. The second plate 9-3 comprises a passage 9-6 for passing of the second drilling tool 9-1 through the second plate 9-3.

The second drilling means 9 are fitted with sensing rods 9-7 which are arranged substantially traverse on second plate 9-2. The sensing rods 9-7 preferably comprises sensing means for sensing the inner and outer circumference of the blade root. The sensing rods can also comprise sensors for measuring the flatness of the blade root end and/or sensors for checking the position of the drilled holes.

The invention is of course not limited to the described and shown preferred embodiment but extends to any embodiment falling within the scope of protection as defined in the claims and as seen in the light of the foregoing description and accompanying drawings.

The invention claimed is:

1. A device (1) for drilling holes in the axial and radial direction of a blade root of a wind turbine, wherein the device (1) comprises:
   a first base (2), which is to be stationary positioned on the ground;
   a second base (3), which is moveably mounted to the first base (2) and movable along a first direction (D);
   first drive means for positioning the second base (3) along the first direction (D);
   a rotary arm (4), which is pivotally mounted to the second base (3) around a main axis (5),
   second drive means for rotating the rotary arm (4) around the main axis (5);
   wherein the rotary arm (4) comprises a guide track (7) which extends from a first outer end (4-1) to a second outer end (4-2) of the rotary arm (4) thereby passing the main axis (5);
   first drilling means (8) moveably arranged on the guide track (7), comprising a first drilling tool (8-1) for drilling radial holes in a second direction (8-2), which second direction (8-2) is perpendicular to the main axis (5) and
   third drive means for positioning the first drilling means (8) along the guide track (7);
   second drilling means (9) mounted on the rotary arm (4), comprising a second drilling tool (9-1) for drilling radial holes in a third direction (9-2), which third direction (9-2) is parallel to the main axis (5);
   wherein the rotary arm (4) comprises a recess (10), wherein the second drilling means (9) are accommodated in the recess (10) and at least partially moveably arranged on the guide track (7) and which device (1) comprises fourth driving means for positioning the second drilling means (9) along the guide track (7), wherein an imaginary plane defined by the second and third direction (8-2;9-2) includes the main axis (5).

2. The device (1) according to claim 1, wherein the device (1) comprises a plate (9-3) which is moveably arranged on the guide track (7), wherein the second drilling means (9) are arranged on a first side of the plate, the plate (9-3) comprises a passage (9-6) for passing of the second drilling tool (9-1) from the first side to a second, opposite, side of the plate (9-3).

3. The device (1) according to claim 2, wherein the guide track (7) comprises two parallel rails (7-1;7-2), which rails (7-1;7-2) are arranged in a plane centered and perpendicular with respect to the main axis (5).

4. The device (1) according to claim 3, wherein the recess (10) is symmetrical in lengthwise direction of the rotary arm (4).

5. The device (1) according to claim 2, wherein the recess (10) is symmetrical in lengthwise direction of the rotary arm (4).

6. The device (1) according to claim 1, wherein the guide track (7) comprises two parallel rails (7-1;7-2), which rails (7-1;7-2) are arranged in a plane centered and perpendicular with respect to the main axis (5).

7. The device (1) according to claim 6, wherein the recess (10) is symmetrical in lengthwise direction of the rotary arm (4).

8. The device (1) according to claim 1, wherein the recess (10) is symmetrical in lengthwise direction of the rotary arm (4).

* * * * *